United States Patent Office.

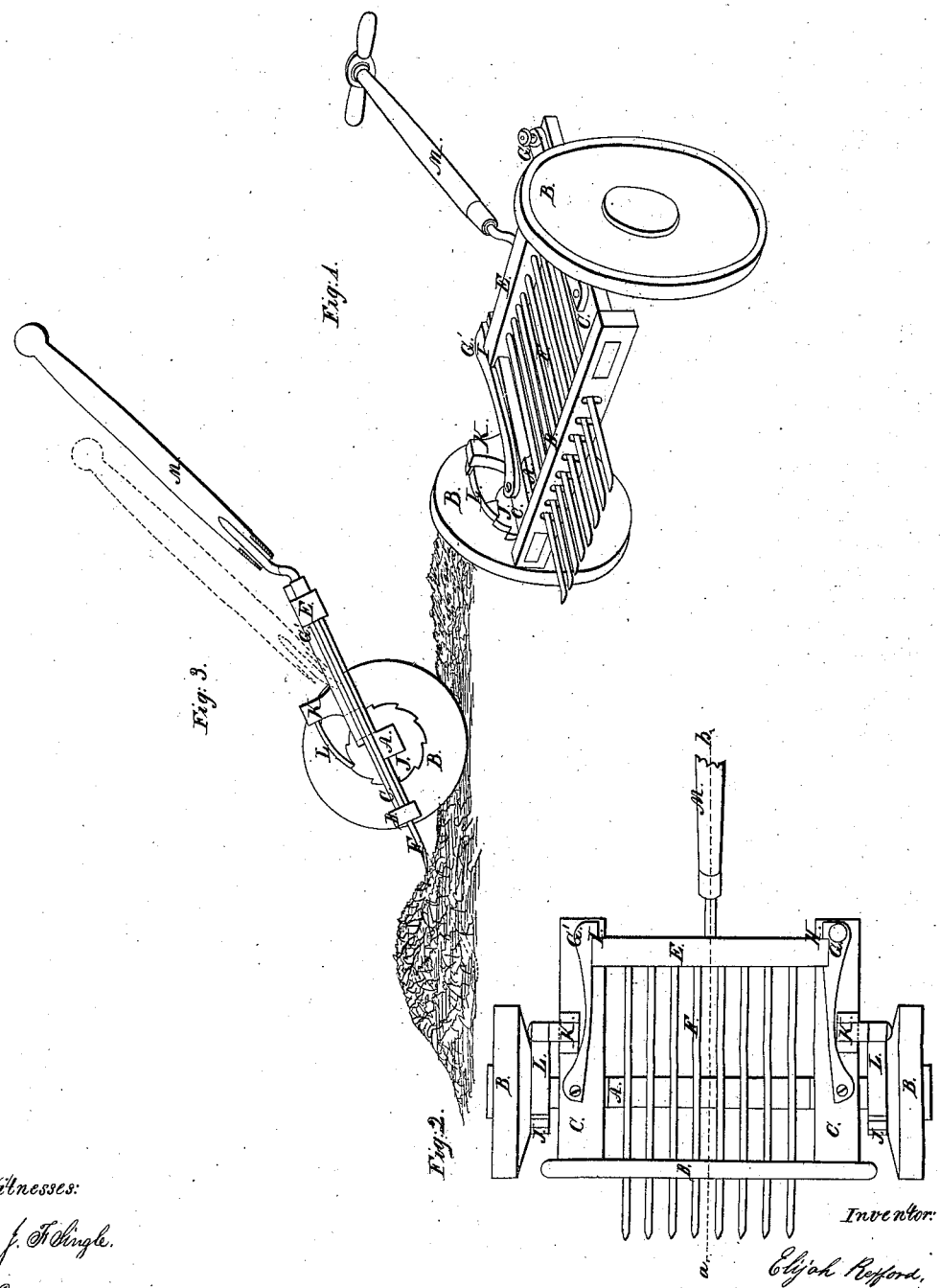

ELIJAH REXFORD, OF MENTOR, OHIO.

Letters Patent No. 64,708, dated May 14, 1867.

---

IMPROVEMENT IN POTATO-DIGGER.

---

*The Schedule referred to in these Letters Patent and making part of the same.*

---

TO ALL WHOM IT MAY CONCERN:

Be it known that I, ELIJAH REXFORD, of Mentor, in the county of Lake, and State of Ohio, have invented a new and improved Hand Potato-Digging Machine; and I do hereby declare that the following is a full and exact description thereof, reference being had to the accompanying drawings, in which—

Figure 1 is a view in perspective of my said machine.

Figure 2, a plan or top view; and

Figure 3 a vertical section through the line $a$–$b$, fig. 2.

The same letters refer to similar parts in all the drawings.

This invention is an improvement on the class of agricultural implements known as hand potato-diggers, and embodies a novel mode for operating a set of tines which are thrust into the potato hill, lifted up, vibrated, and then drawn back to discharge the potatoes, the mechanism being supported on wheels provided with a pawl and ratchet arrangement, and the said operation of digging, &c., performed by the aid of lever power. It is simple and efficient in all its parts, and can be manufactured at little cost, and will materially lessen the labor of potato digging by hand. The following is a description of its construction and operation:

A is an axle-tree supported on a pair of wheels, B B. On said axle-tree are secured two guides, C C, on the forward ends of which is mortised a perforated rail, D. The digging fork, as seen fully in fig. 2, consists of a head E and set of tines, F. The said head E is notched at its extremities, and fits on the inside of the guides C C, on which it slides free. The said tines are passed through the perforations of the rail D. On the upper face of the said guides are secured two spring-catches, G and G'. The left-hand catch G has a notch, H, to admit the end of the fork-head E; the other catch, G', has a shoulder, I. On the inside of the wheels B B is a ratchet-wheel, J, and supported on blocks K are pawls, L. To the head of the fork is secured a stout handle, M, by which the machine is driven and worked.

The operation is thus: The fork being drawn back to the position shown in fig. 3, the attendant drives the machine towards a hill and brings the points of the tines in contact with it; he then pushes back the spring G so as to release the head E from the notch; he then forces the tines into and through the hill by a thrust of the handle, which brings the tines in the position shown by the dotted lines in fig. 3; he then depresses the handle so as to bring the fork about horizontal, taking up the contents of the hill with the vines and loose soil, removing the vines by the hand; he vibrates the fork by means of the handle to screen the earth, &c., from the potatoes. When this is done he pulls back the fork to its former position, and the potatoes are dropped from the tines on the ground. He then passes on to the next hill and repeats the operation. The use of the ratchet and pawl is to prevent the wheels turning at the moment the fork is drawn back, as just explained.

It will be seen that the labor of lifting the contents of the hill is done with much facility and little exertion, which is due to the leverage by which the fork is brought up, the axle-tree acting as a fulcrum.

What I claim, and desire to secure by Letters Patent, is—

1. The mode of supporting the fork, as described, so that it can be operated in the peculiar manner set forth by means of the guides C C, notched head E, spring-catches G G', perforated rail D, ratchet and pawls J L, and handle M, or by means equivalent thereto, as and for the purposes stated.

2. Supporting the guides C C, and perforated rail D, which carries the said fork on the axle-tree A and wheels B B, whereby I am enabled to use said axle-tree as a fulcrum for raising the said fork with its contents, as set forth.

ELIJAH REXFORD.

Witnesses:
 J. F. SINGLE,
 M. S. HARVEY.